(12) United States Patent
Ehrenhardt et al.

(10) Patent No.: US 6,640,271 B2
(45) Date of Patent: Oct. 28, 2003

(54) ENGINE ECM MULTI-INPUT/OUTPUT CONFIGURATION

(75) Inventors: Kevin D. Ehrenhardt, Eureka, IL (US); Prasad V. Parupalli, Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 10/054,801

(22) Filed: Jan. 23, 2002

(65) Prior Publication Data

US 2002/0103955 A1 Aug. 1, 2002

Related U.S. Application Data

(63) Continuation of application No. 09/265,208, filed on Mar. 10, 1999, now abandoned.

(51) Int. Cl.[7] .............................................. G06F 13/00
(52) U.S. Cl. ........................ 710/100; 713/1; 310/71; 439/189; 710/104
(58) Field of Search .......................... 701/1; 439/189, 439/926, 955, 956; 310/71; 710/62, 63, 65, 72, 73, 100, 305, 106, 104; 713/1

(56) References Cited

U.S. PATENT DOCUMENTS

| | | | | |
|---|---|---|---|---|
| 4,606,003 A | * | 8/1986 | Daniels ........................ 711/2 |
| 4,727,514 A | * | 2/1988 | Bhuva et al. ................ 365/104 |
| 4,972,470 A | * | 11/1990 | Farago .................... 439/189 X |
| 5,289,580 A | * | 2/1994 | Latif et al. .................... 710/63 |
| 5,339,262 A | * | 8/1994 | Rostoker et al. ........ 395/500.05 |
| 5,365,436 A | * | 11/1994 | Schaller et al. ............... 701/33 |
| 5,473,758 A | * | 12/1995 | Allen et al. .................. 711/103 |
| 5,668,419 A | * | 9/1997 | Oktay .................... 439/955 X |
| 5,802,270 A | * | 9/1998 | Ko et al. ....................... 714/27 |
| 5,832,244 A | * | 11/1998 | Jolley et al. ................. 710/129 |

\* cited by examiner

Primary Examiner—Xuan M. Thai
(74) Attorney, Agent, or Firm—Clifton G Green; Kelsey L Milman; D James Barnes

(57) ABSTRACT

A engine controller includes a connector having pins that provide an electrical connection between devices external to the controller and internal electrical components. The programming tool is used to program the controller to assign particular pins to transmit or receive certain signals.

9 Claims, 3 Drawing Sheets

Fig_2_
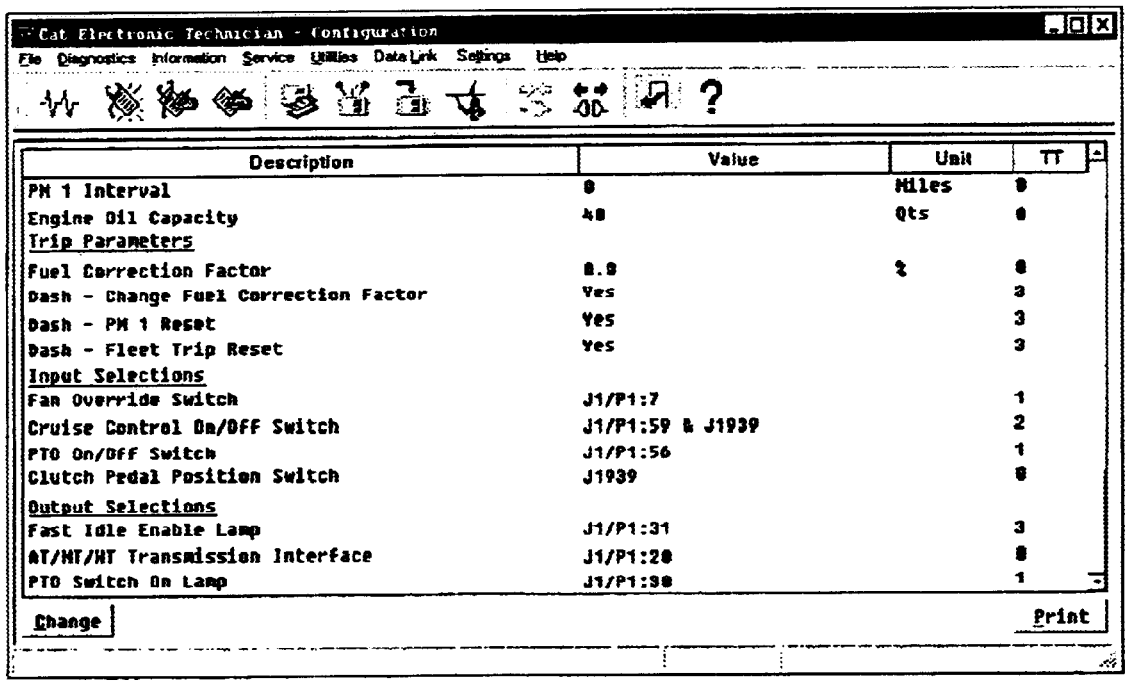
Fig_3_
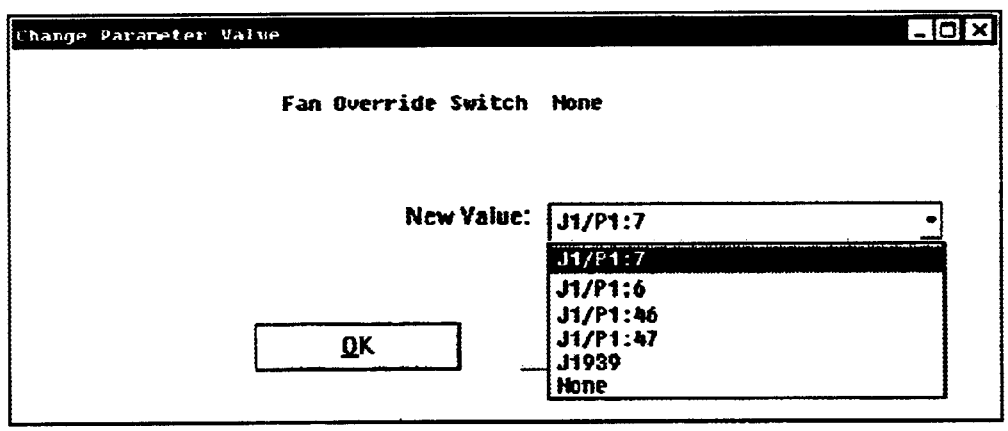

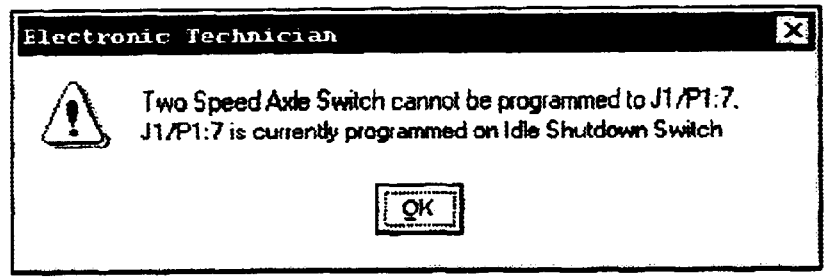
Fig_4_
Fig_5_

ENGINE ECM MULTI-INPUT/OUTPUT CONFIGURATION

This application is a continuation of application Ser. No. 09/265,208, filed Mar. 10, 1999, now abandoned.

TECHNICAL FIELD

The present invention relates to electronic controllers and, more particularly, to electronic controllers having multiple inputs and outputs.

BACKGROUND ART

Engine controllers are known in the art. Typically, an engine controller includes a microprocessor or other electronic controller and associated electrical components that are electrically connected on a circuit board. Those components must then be protected from the harsh environment of the engine compartment. Typically this protection is in the form of a metallic enclosure that isolates the circuitry from that environment. To connect the controller circuitry with external components such as sensors and actuators it is necessary to have connectors on the exterior of the electronic controller, the connectors having various pins to connect with an external wiring harness. The wiring harness then must be designed to connect specific desired devices to desired pins on the controller connector. Moreover, the same controller is generally used in many different engine and vehicle configurations. In those differing applications there may be some instances where the connectors must be physically dismantled and rewired to permit the electronic controller to receive and send all the desired signals for that configuration. The disassembly and rewiring is a time consuming, expensive procedure that can be prone to error. It would be preferable to have an electronic controller that is flexible enough to accommodate many different engine and vehicle configurations without hardware change.

DISCLOSURE OF THE INVENTION

In one aspect of the invention, an electronic controller includes a controller connected with a connector. The connector includes a plurality of pins, each pin capable of receiving or transmitting a signal from said electronic controller to an external device. The controller is programmed to configure the pin-out of the connector.

These and other aspects and advantages of the present invention will become apparent upon reading the detailed description of the preferred embodiment in connection with the drawings and appended claims.

BRIEF DESCRIPTION OF THE DRAWINGS

FIG. 2 shows an exemplary display of the function configuration screen.

FIG. 3 shows an exemplary display of a direct programming screen.

FIG. 4 shows an exemplary display of a warning that is issued in the event of a pin-out conflict.

FIG. 5, shows an exemplary display of a Status Screen associated with a preferred embodiment of the present invention.

DETAILED DESCRIPTION OF A PREFERRED EMBODIMENT

Figure 1:
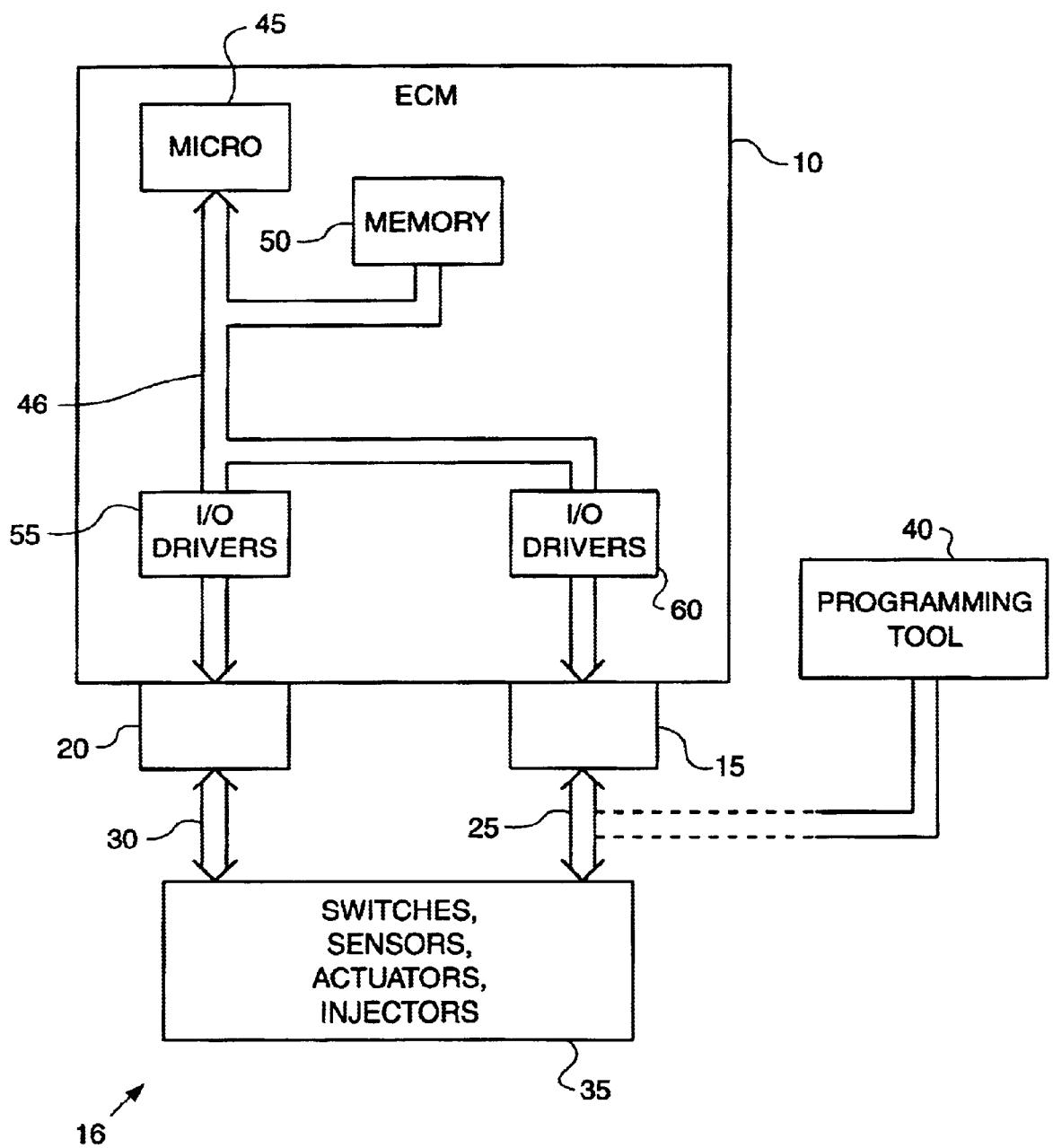
FIG. 1 shows a system level block diagram of an engine control system associated with a preferred embodiment of the present invention.

For the purpose of promoting an understanding of the principles of the invention, reference will now be made to the embodiment illustrated in the drawings and specific language will be used to describe that embodiment. No limitation of the scope of the present invention is intended by reference to this embodiment. To the contrary the present invention as defined by the appended claims includes those modifications and alterations as would normally occur to those skilled in the art to which the invention relates.

Referring first to FIG. 1, there is shown an electronic control module (ECM) 10 in communication with typical engine componentry 16, which in the drawing includes various switches, sensors, actuators and fuel injectors 35. Also connected with the ECM 10 is a programming tool 40. As is known to those skilled in the art, the ECM 10 typically includes an electronic controller in the form of a microprocessor 45 having various types of memory components 50 which may include volatile random-access memory (RAM), and nonvolatile read-only memory (ROM). Of course, the ECM 10 could also include other types of memory instead of, or in addition to, RAM and ROM, such as flash EPROM or EEPROM memories, as is well known in the art. Those skilled in the art could readily and easily construct an ECM using such known components. The ROM, or other non-volatile memory, typically will include software code instruction sets, which are executed to perform various control and information functions, as well as data tables, which contain calibration values and parameters characterizing normal engine operation. Also known to those skilled in the art is that the microprocessor 45 typically will communicate with the engine componentry and other devices outside the ECM through input and output (I/O) drivers 55, 60. Such I/O drivers protect the controller from hostile electrical impulses while permitting the signals and power necessary for engine control to be transmitted through the interface. The ECM componentry detailed above is interconnected by data, address and control buses generally shown in FIG. 1 as element 46. Those skilled in the art can readily and easily implement an addressing and data structure to permit communication between the ECM 10 components over the buses 46. As is known to those skilled in the art, additional components such as multiplexers could be included in the addressing and data buses. It should be noted that there are a variety of other possible control schemes which include various combinations of microprocessors and electric or electronic circuits which could perform the same function.

Although the I/O drivers 55, 60 are shown as two discrete boxes, their block diagram representation in FIG. 1 should not be construed as limiting the present invention to two I/O drivers. To the contrary, as would be apparent to those skilled in the art, the present invention may include as many or as few I/O drivers as necessary to interface with external components.

With continuing reference to FIG. 1, engine componentry 16 typically includes a plurality of fuel injectors, which may include hydraulic electronic unit injectors, each associated with a particular engine cylinder; and a plurality of sensors for indicating various engine operating conditions, such as coolant temperature, air temperature, oil temperature, fuel temperature, intercooler temperature, accelerator pedal position, intake manifold pressure, fuel pressure, oil pressure, coolant pressure, cylinder position, and cylinder sequencing to name a few. Engine componentry 16 also includes actuators which may include solenoids, variable valves, indicator lights, motors, and/or generators, among others. It should be appreciated that the ECM 10 may also be in communication with other vehicle componentry and microprocessors which control associated vehicle systems, such as the brakes, the clutch, the transmission, a vehicle management system or a fleet management transponder. The sensors, actuators and injectors typically are connected to the I/O drivers 55, 60 through connectors 20, 15. As is known to those skilled in the art, the ECM 10 generally includes a hard protective covering that keeps dirt, grease and other contaminants from contacting the microprocessor 45 and other electrical components. The connectors 20, 15 typically include pins inside a socket (not shown) that permit external devices to be electrically connected with the components internal to the ECM 10. Wiring 30, 25 is attached to a connector plug, which is then inserted into the socket of the respective connector 20, 15, thereby connecting the I/O drivers 55, 60 to the external devices including the sensors, actuators, and injectors 35.

A programming tool 40 typically is used at the factory to program an engine to operate in a desired manner. Another programming tool may be a PC based hand-held programming device that can be used by a fleet owner, field service technician, or other end user. In a preferred embodiment, such a device is connected to the ECM through one of the connectors 20, 15, although other embodiments may include different connectors for the programming tool.

As is known to those skilled in the art, typical prior art connectors have a fixed number of pins, and each pin is associated with a specific input or output. For example, on an ECM used in connection with an engine, pin number 16 might be associated with a cruise control on/off switch. In those prior art controllers, pin 16 would go unused if the specific vehicle on which the engine was used did not have cruise control. The present invention is used to overcome this drawback by permitting an appropriate user to reprogram the ECM to associate a specific function with a specific pin in connector 20, 15. In this manner, if the vehicle in the above example did not have cruise control, but did have a Power-Take-Off ("PTO") then pin 16 could be reassigned from a cruise control sensor input to a PTO sensor input, for example.

In a preferred embodiment of the present invention, the communications between the sensors, actuators and injectors 35 is governed by a Society of Automotive Engineers ("SAE") communication standard J1939. However, those skilled in the art will recognize that other data links can be readily and easily implemented in connection with the present invention. Examples of other such data links include the American Trucking Association Standard J1587, among other data links. In a preferred embodiment there are some connector pins that are programmable and some pins that are assigned to a function through inferred programming. Inferred programming refers to the automatic assignment of some of the connector pins to a certain function based on the direct programming of other pins by the operator. For example, if the PTO configuration is programmed to be controlled by Cab Switches, Remote Switches or a Remote Throttle, then a certain pin on the connector (J1/P1:56) will be inferentially programmed to be a PTO On/Off Switch.

In a preferred embodiment, functions that are directly programmable by the operator, include:

1. Fan Override Switch programmable to None (default), J1/P1:7, J1/P1:47, J1/P1:6, J1/P1:46, or J1939.
2. Fast Idle Enable Switch programmable to None (default), J1/P1:7, J1/P1:47, J1/P1:6, or J1/P1:46. This is heavy duty only.
3. Ignore Brake/Clutch Switch programmable to None (default) or J1/P1:47.
4. Idle Shutdown Switch programmable to None (default), J1/P1:7, J1/P1:47, J1/P1:6, or J1/P1:46.
5. Torque Limit Switch programmable to None (default or J1/P1:7.
6. Diagnostic Enable programmable to None (default), J1/P1:46, or J1939.
7. Remote PTO Set Switch Input programmable to J1/P1:58 (default), or None.
8. Remote PTO Resume Switch Input programmable to J1/P1:60 (default), or None.
9. PTO Engine RPM Set Speed Input A programmable to None (default) or J1/P1:58.
10. PTO Engine RPM Set Speed Input B programmable to None (default) or J1/P1:60.
11. PTO Engine RPM Set Speed Input C programmable to None (default) or J1/P1:7.
12. PTO Engine RPM Set Speed Input D programmable to None (default) or J1/P1:47.
13. Throttle Limit/Disable Switch programmable to None (default) or J1/P1:6.
14. Shutdown Switch with PTO On programmable to None (default), J1/P1:7, J1/P1:47, J1/P1:6, or J1/P1:46.
15. Starting Aid On/Off Switch None (default), J1/P1:7, J1/P1:47, J1/P1:6, or J1/P1:46.
16. Two Speed Axle programmable to None (default) and J1/P1:6.
17. Cruise Control On/Off Switch programmable to J1/P1:59 (default), J1939, or J1/P1:59 and J1939.
18. Cruise Control Set/Resume Switch programmable to J1/P1:35 and 44 (default), J1939, or J1/P1:35 and 44, and J1939.
19. Clutch Pedal Position Switch programmable to J1/P1:22 (default) or J1939.
20. Retarder Off/Low/Medium/High Switch programmable to J1/P1:23 and 40 (default), J1939, or J1/P1:23 and 40, and J1939.
21. Service Brake Pedal Position Switch programmable to J1/P1:45 (default) or J1939.
22. Accelerator Pedal Position programmable to J1/P1:66 (default) or J1939.
23. Engine Running Output programmable to None (default), J1/P1:10, J1/P1:23, or J1/P1:13.
24. Auxiliary Brake programmable to None (default) or J1/P1:12.
25. Fast Idle Enabled Lamp programmable to None (default) or J1/P1:39.

For the above list, "None" indicates the Input or Output is not used.

Examples of inferred programming included in a preferred embodiment are as follows:

1. J1/P1:56 operates as a PTO On/Off Switch when PTO Configuration is programmed to Cab Switches, Remote Switches, or Remote Throttle. Default setting for PTO Configuration is Off, meaning this Input is not used.
2. J1/P1:68 operates as a PTO Accelerator Sensor input when PTO Configuration is programmed to Remote Throttle. Default setting for PTO Configuration is Off, meaning this Input is not used.
3. J1/P1:26 operates as an Outside Temperature Sensor when Allowed Idle Shutdown Override is programmed to Outside Temperature Based. Default setting for Allow Idle Shutdown Override is Yes, this Input is not used unless this parameter is programmed to Outside Temperature Based.
4. J1/P1:41 operates as an A/C High Pressure Switch input if the Fan Control type is programmed to On-Off or Horton Three-Speed and the A/C Pressure Switch Fan-On Time is programmed in the 1–600 second range (default=0 seconds, feature disabled). This is for HD and MD Full Feature only.

5. J1/P1:64 operates as a second brake switch when Transmission Style is programmed to Automatic Option 2, AT/MT/Ht Option 2 (MD Full Feature only), Automatic Option 3, or At/MT/HT Option 3 (MD Full Feature only).

6. J1/P1:62 operates as a transmission neutral switch when Transmission Style is programmed to Automatic Option 3, AT/MT/HT Option 3 (MD Full Feature only), Automatic Option 4, or AT/MT/HT Option 4 (MD Full Feature only).

7. J1/P1:30 operates as a PTO Switch On Lamp when PTO Configuration is programmed to Cab Switches, Remote Switches, or Remote Throttle. Default setting for PTO Configuration is Off, meaning this Output is not used.

8. J1/P1:13 operates as a Second Fan driver when Fan Control type is programmed to Horton 3-speed. Default setting for Fan Control Type is None, meaning this Output is not used. This is a HD feature only.

9. J1/P1:11 operates as a On/Off Fan Driver or Cooling Fan Driver when Fan Control Type is programmed to On-Off Fan or Horton 3-Speed respectively. Default setting for Fan Control type is None, meaning this Output is not used. this is for HD and MD Full Feature only.

10. J1/P1:19 operates as a Lockout Solenoid when Transmission Style is programmed to Eaton Top 2. Default setting for Transmission Style is Manual, this Output is not used unless this parameter is programmed to Eaton Top 2. This is a C-10, C-12, and 3406E feature only.

11. J1/P1:20 operates as a Shift Solenoid when Transmission Style is programmed to Eaton Top 2 (HD only), or as the Transmission Interface Relay (MD Full Feature only) if the Transmission Style is programmed to AT/MT/HT Option 1, AT/MT/HT Option 2, AT/MT/HT Option 3, or AT/MT/HT Option 4.

Function Configuration

Each function can be configured so that it uses a specific connector 20, 15 pin as a data source. The configuring of the functions will take place through the programming tool 40. Referring now to FIG. 2, a preferred embodiment includes two parameter groupings: (1) an Input Selections group which will contain a listing of all input functions for which the user can programmably select a connector pin, and (2) an Output Selections group which will contain a listing of all output functions for which the user can programmably select a connector pin. Each function will be labeled according to its name and will have a list of available connector pins data sources. FIG. 2 shows a representative configuration used in connection with a preferred embodiment.

Direct Programming

Each function can be configured to a specific connector pin to use as a data source. This is referred to as direct programming since the service tool 40 is used to directly program a function to the desired connector pin. To program a function to a certain connector pin, the service tool will assign that pin to the desired function using the function's configuration ("PID"). FIG. 3 shows a representative display screen for direct programming.

The service tool will not allow the user to program the same input or output to two or more functions. If the user tries to program a function to pin that has already been assigned to another function, then the service tool will warn the operator that the pin is currently programmed to another function and will issue a warning. The service tool will cycle through all of the function parameters to determine if an input or output has already been programmed. FIG. 4 shows an example of the display screen that will appear in the event that the user attempts to program a connector pin to more than one function.

Inferred Parameter Programming

As described above, some functions will be indirectly programmed. This occurs when a specific feature is directly programmed and that feature requires various other supporting functions to be programmed to other connector pins. The term "Inferred Programming" is use because the service tool is used to program a specific feature inferring an input or output will be used for a certain function rather than directly programming the function to a desired input or output. Since various functions will need to be reprogrammed to certain inputs and outputs, it is necessary to inform the user about what functions need to be changed and to what I/O. This information will be conveyed through an Inferred Parameters, Parameter Identifier ("PID").

However, there are some instances where the inferred parameters (and their inferred I/O) create conflicts with other parameters. For example, in some circumstances this problem can occur with the Fan Control. When the Fan Control Type is programmed to a Horton 3-Speed, the Second Fan Driver must operate on Output #4 in order to support this feature; however, Engine Running Output could also be programmed on Output #4. If Engine Running Output is currently using Output #4, and the user wants to use a Horton 3-Speed Fan, it becomes necessary to inform the user that the Engine Running Output must be reprogrammed to another output other than Output #4 in order to program the Fan Control Type to a Horton 3-Speed.

To inform the user that these changes need to be made, the service tool will request from the ECM the inferred parameters that could cause conflicting support. The ECM will generate a table of the inferred parameters configuration PIDs that can cause conflicting support by the programming of this feature. Along with the inferred function PIDs, the ECM should also provide the default (or inferred) setting for each parameter.

After the service tool has received the inferred parameters and their inferred value, the service tool will check all of the other functions' pin assignments to see if any of them are programmed to a pin that needs to be used for the inferred parameter. If that particular pin is not being used by any other function, then the service tool will proceed to program the original configuration parameter to its new feature. However, if the inferred pin is already being used by another function, then the service tool will warn the operator that the pin is currently being used by another function and will suggest to reprogram that function to another pin in order to support the feature. The service tool will not request the ECM to change the original configuration parameter until the inferred parameters can be programmed correctly.

The following description generally describes the inferred parameter programming process used in connection with a preferred embodiment. First, the user selects a function or connector pin to change and enters its new value.

1. The operator selects a new connector pin for a desired function. The service tool determines if the desired function has any inferred parameters that could cause conflicting support. If the desired function does not have any inferred parameters that could create a conflict, then the service tool proceeds to step 4. If, however, the function does have inferred parameters that could have conflicting connector pin requirements, the service tool proceeds to step 2.

2. The service tool first sends a write request to an Inferred Parameters subroutine, including the desired function and its desired connector pin value. This desired function has inferred parameters that may cause conflicting support. The ECM responds with the inferred parameters that could create a conflict and their default value.

3. The service tool checks each inferred parameter to determine if its default connector pin assignment is currently being used by another function. If none of the default connector pin assignments are being used by another function, then the inferred parameters can be used and the service tool proceeds to step 4. Else, if any of the default connector pin assignments are being used, the service tool will inform the operator that another function is currently using the inferred default connector pin and will suggest that the operator reprogram the desired function to another connector pin for inferred parameters that have conflicts with other parameters. The service tool goes back to step 1.

4. The service tool will proceed to send a write request to program the function to the desired connector pin.

Function Status

The status of each function will be displayed in a subroutine referred to as the Status tool. Each function will be labeled according to its name and current connector pin assignment (i.e.—PTO On/Off Switch—J1/P1:56). The functional status value of the parameter will be shown next to the parameter label. This value represents the functional status the ECM has chosen for the particular parameter. The actual status data from the data sources can be observed in another screen found under the Diagnostics menu. See FIG. 5 for a sample Status screen.

Special Tests

Special tests will be supported for each output function. These special tests will be performed in a subroutine generally referred to as the Special Tests tool. Each special test corresponding to an output will be labeled according to its function name and current connector pin assignment (i.e.— Auxiliary Brake—J1/P1:12). The actual status of the special test for that output function will be shown next to the special test label. For functions that are not programmed to an output, just the function name will be displayed along with "Not Installed" as the status description.

Table 1 below lists the special tests that are supported by a preferred embodiment of the invention.

TABLE 2

Special Tests Table

Special Test Description
None
Injection Act Press Driver Test
55 MPH VSP/Speedometer Test
Tachometer Circuit Test
Auxiliary Brake
PTO Switch On Lamp
Cooling Fan Driver
On/Off Cooling Fan
Lockout Solenoid
Shift Solenoid
Second Fan Driver
Engine Running Output
Transmission Interface Relay The service tool 40 will keep track of the available special tests for each ECM; in addition, the service tool 40 will assume that each output function that the ECM supports will have a special test. The ECM and service tool should both determine if a special test can be performed on an output function. The service tool will allow a special test on the output function only if it is programmed to an output data source.

What is claimed is:

1. A configurable control system, comprising:
   an electronic control module configurable to control the operation of one or more devices external to the electronic control module, the electronic control module including one or more pins and being configurable to receive at least one data input signal on at least one of the pins and further being configurable to create and transmit at least one control signal as a function of the data received through the at least one data input signal;
   at least one input device external to the electronic control module and coupled with at least one input pin of the electronic control module, the at least one input device being operable to transmit the at least one data input signal;
   at least one responsive device external to the electronic control module and coupled with at least one output pin of the electronic control module, the at least one responsive device being operable to execute a desired response as a function of the at least one control signal; and
   a programming tool external to, and operable to be coupled with, the electronic control module, the programming tool being operable to configure the electronic control module to (i) receive the at least one data input signal over the at least one input pin, (ii) create the at least one control signal, and (iii) transmit the at least one control signal over the at least one output pin.

2. The configurable control system of claim 1, further comprising a connector element;
   wherein the at least one input pin and the at least one output pin are arranged within the connector element.

3. The configurable control system of claim 2, wherein at least one input device and at least one responsive device are coupled to the electronic control module via the connector element.

4. The configurable control system of claim 2, wherein the programming tool is configured to be connectable to the connector element.

5. The configurable control system of claim 1, wherein the at least one responsive device is an engine component.

6. The configurable control system of claim 1, wherein the at least one responsive device is at least one of a switch, a sensor, an actuator, and a fuel injector.

7. The configurable control system of claim 1, wherein the programming tool is distinct from, and external to, the at least one input device and the at least one responsive device.

8. The configurable control system of claim 1, wherein:
   the electronic control module is configurable to receive at least two data input signals, each signal being receivable on an input pin, the electronic control module further being configurable to create and transmit at least one control signal as a function of the data received through all of the at least two data input signals;
   at least two input devices external to the electronic control module are each coupled with at least one input pin of the electronic control module and operable to transmit at least one data input signal; and
   the programming tool is operable to configure the electronic control module to (i) receive each of the at least two data input signals over the respective input pin, (ii) create the at least one control signal, and (iii) transmit the at least one control signal over the at least one output pin to the at least one responsive device.

9. A method for configuring an electronic control module to control one or more responsive devices, the electronic control module having a plurality of pins for (i) receiving one or more data input signals from one or more input devices and (ii) transmitting one or more control signals to one or more responsive devices, the method comprising:

determining one or more data input signals to be received by the electronic control module;

determining one or more control signals to be (i) created by the electronic control module as a function of the one or more data input signals and (ii) transmitted by the electronic control module over one or more of the pins to at least one responsive device external to the electronic control module;

coupling an external programming tool to the electronic control module;

configuring, via the external programming tool, the electronic control module to (i) receive the one or more data input signals over one or more respective pins, (ii) create at least one control signal as a function of the data received through the one or more data input signals, and (iii) transmit the one or more control signals over one or more respective pins; and decoupling the external programming tool from the electronic control module.

* * * * *